(12) United States Patent
DeLuca et al.

(10) Patent No.: US 9,992,407 B2
(45) Date of Patent: Jun. 5, 2018

(54) IMAGE CONTEXT BASED CAMERA CONFIGURATION

(71) Applicant: International Business Machines Corporation, Armonk, NY (US)

(72) Inventors: Lisa Seacat DeLuca, Baltimore, MD (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 14/872,615

(22) Filed: Oct. 1, 2015

(65) Prior Publication Data

US 2017/0099432 A1    Apr. 6, 2017

(51) Int. Cl.
| | |
|---|---|
| *H04N 5/235* | (2006.01) |
| *H04N 5/232* | (2006.01) |
| *G06K 9/62* | (2006.01) |
| *G06K 9/00* | (2006.01) |

(52) U.S. Cl.
CPC ..... *H04N 5/23219* (2013.01); *G06K 9/00315* (2013.01); *G06K 9/6202* (2013.01); *G06K 9/6212* (2013.01); *H04N 5/2351* (2013.01); *H04N 5/2354* (2013.01); *H04N 5/23216* (2013.01)

(58) Field of Classification Search
None
See application file for complete search history.

(56) References Cited

U.S. PATENT DOCUMENTS

| | | | |
|---|---|---|---|
| 5,689,241 A | 11/1997 | Clark, Sr. et al. | |
| 8,212,894 B2* | 7/2012 | Nozaki | H04N 5/232 348/222.1 |
| 8,218,849 B2 | 7/2012 | Lu et al. | |
| 2012/0242818 A1* | 9/2012 | Chiang | H04N 5/2258 348/77 |
| 2014/0179295 A1 | 6/2014 | Luebbers et al. | |
| 2016/0026866 A1* | 1/2016 | Sundaresan | G06K 9/00671 705/26.7 |

FOREIGN PATENT DOCUMENTS

| | | | |
|---|---|---|---|
| JP | 2004222118 A | * | 8/2004 |
| JP | 2006012062 A | * | 1/2006 |
| WO | 2012036669 A1 | | 3/2012 |
| WO | 2014021547 A1 | | 2/2014 |

OTHER PUBLICATIONS

LaBancz-Bleasdale, Mellisa; "10 Ways to Get Your Lighting Right"; May 8, 2013; www.houzz.com; pp. 1-8.*

* cited by examiner

*Primary Examiner* — Gary C Vieaux
(74) *Attorney, Agent, or Firm* — Gilbert Harmon, Jr.

(57) ABSTRACT

An approach to configuring camera settings to reduce the intrusiveness of image capture on image subjects. A preliminary image is analyzed to determine an image context. The image context is compared to intrusiveness context cues, either known or discovered from analyzing historical images associated with the subjects identified in the preview image. If any intrusiveness context cues are found in the image context then configuration parameters associated with the intrusive context cues are changed to minimize the intrusive nature before the image is captured.

20 Claims, 3 Drawing Sheets

IMAGE CONTEXT BASED CAMERA CONFIGURATION

BACKGROUND OF THE INVENTION

The present invention relates generally to digital camera configuration and more specifically, to camera configuration based on image context.

Improvements in hardware technology associated with mobile devices have led to incorporation of cameras for pictures and videos. Efforts to provide functional and aesthetic similarity with previous camera and video equipment have led to the use of incorporated speakers to provide audible sounds, associated with camera operation, and light emitting diodes (LEDs) to produce light (flash), associated with image acquisition. However, there are circumstances where it is desirable to control the speaker and/or LED output based on the context of a camera framed image.

SUMMARY

According to an embodiment of the present invention, a method for updating settings associated with a camera to reduce intrusiveness to image subjects, the method comprising: analyzing a preliminary image to form a current context; comparing the current context to one or more intrusiveness context cues; and responsive to detecting the current context matching the one or more intrusiveness context cues, performing an action facilitating a change of image capture settings to reduce intrusiveness.

According to another embodiment, a computer program product for reducing intrusiveness to image subjects based on updating a configuration associated with a camera, the computer program product comprising: one or more computer readable storage media and program instructions stored on the one or more computer readable storage media, the program instructions comprising: program instructions to analyze a preliminary image to generate a current context; program instructions to compare the current context to one or more intrusiveness context cues; and program instructions to, responsive to detecting the current context matching the one or more intrusiveness context cues, performing an action facilitating a change of the configuration to reduce intrusiveness.

According to another embodiment, a computer system for reducing intrusiveness to image subjects based on updating a configuration associated with image capture, the computer system comprising: one or more computer processors; one or more computer readable storage media; program instructions stored on the one or more computer readable storage media for execution by at least one of the one or more computer processors, the program instructions comprising: program instructions to analyze a preliminary image to generate a current context; program instructions to compare the current context to one or more intrusiveness context cues; and program instructions to, responsive to detecting the current context matching the one or more intrusiveness context cues, performing an action facilitating a change of the configuration to reduce intrusiveness.

DETAILED DESCRIPTION

The embodiments depicted and described herein recognize the benefits of interpreting the context of a camera's framed image and the associated image environment for adjusting configuration parameters based on cues discovered in the image/environment before taking a picture. In one example, when an embodiment processes a framed image and detects a baby with closed eyes, the embodiment can change the camera configuration to mute the shutter sound before taking a picture to prevent waking the baby. In another example, when an embodiment processes a framed image and facially recognizes a specific child, known to cry at each instance of flash photography, the embodiment can change the camera configuration to disable the flash before taking a picture to prevent flash trauma to the child. In another example, when the ambient noise level, detected by a microphone on a camera computing device, is below a preconfigured minimum, the embodiment can change the camera configuration to mute the shutter sound before taking a picture.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
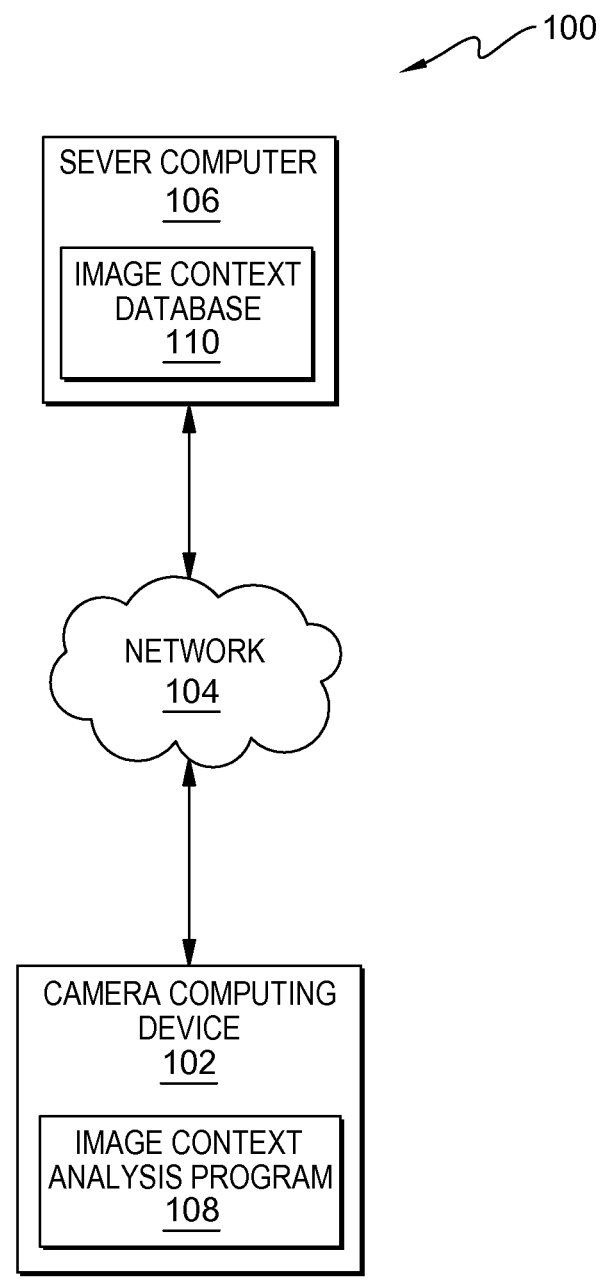
FIG. 1 is a functional block diagram depicting an image capture computing environment, in accordance with an embodiment of the present invention.

FIG. 1 is a functional block diagram illustrating, generally, an embodiment of an image context analysis environment 100. The image context analysis environment 100 comprises an image context analysis component 108 operating on a camera computing device 102, an image context database 110 operating on server computer 106 and a network 104 supporting communications between the image context analysis program 108, operational on the camera computing device 102 and the image context database 110. Although represented in this figure as residing on server computer 106, the image context database 110 can also reside on the camera computing device 102. Further, some embodiments can operate without the image context database 110 or with the image context database 110 located on both server computing device 106 and camera computing device 102.

Camera computing device 102 can be any type of embedded computer suitable for operation in a camera and capable of communicating with a server computer 106 via network 104. Camera computing device 102 includes image context analysis program 108 for analyzing images or other inputs, e.g., microphones, for detecting any cues in the image or associated environment indicating possible configuration parameters. Camera computing device 102 can include internal and external hardware components, as depicted and described in further detail with respect to FIG. 4.

Network 104 can be, for example, a local area network (LAN), a wide area network (WAN) such as the Internet, or a combination of the two, and can include wired, wireless, or fiber optic connections. In general, network 106 can be any combination of connections and protocols that will support communications between camera computing device 102 and server computer 106.

Server computer 106 can be a standalone computing device, management server, a web server, a mobile computing device, or any other electronic device or computing system capable of receiving, sending, and processing data. In other embodiments, server computer 106 can represent a server computing system utilizing multiple computers as a server system. In another embodiment, server computing device can be a laptop computer, a tablet computer, a netbook computer, a personal computer, a desktop computer, or any programmable electronic device capable of communicating with other computing devices (not shown) within image context analysis environment 100 via network 104. In another embodiment, server computing device 106 represents a computing system utilizing clustered computers and components (e.g., database server computers, application server computers, etc.) that act as a single pool of seamless resources when accessed within image context analysis environment 100. Server computer 106 can include internal and external hardware components, as depicted and described in further detail with respect to FIG. 4.

Figure 2:
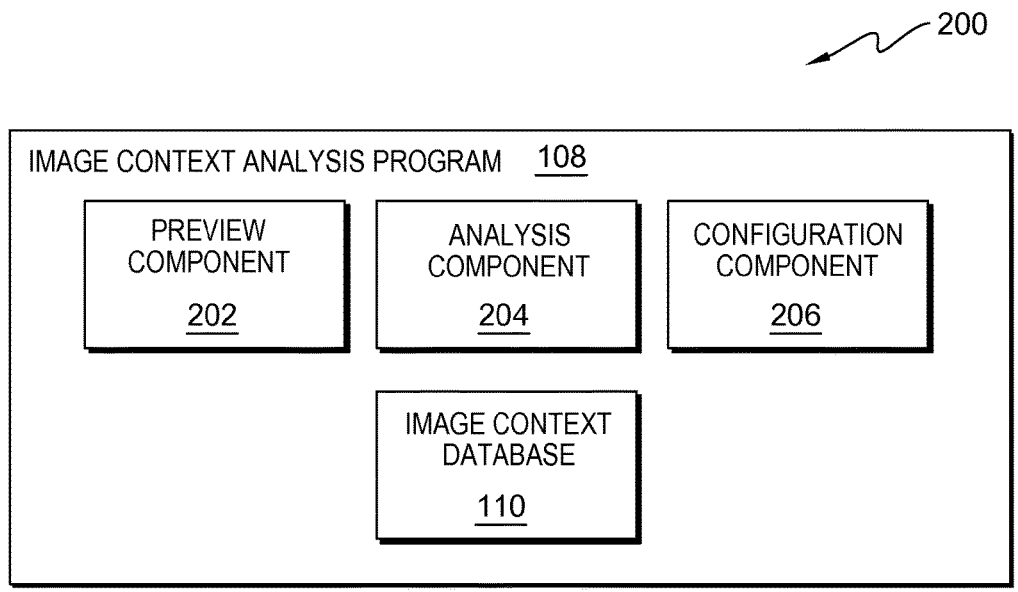
FIG. 2 is a functional block diagram depicting an image context analysis component, in accordance with an embodiment of the present invention.

FIG. 2 is a functional block diagram 200 illustrating image context analysis component 108 comprising preview component 202, analysis component 204, configuration component 206 and image context database 110.

Preview component 202 of an embodiment of the present invention provides the capability to view a preliminary image before the camera has fully processed the image as a photograph and collect information associated with the preview image but not visible in the preview image. Preview component 202 provides the preliminary image to analysis component 204 for image context processing. Preview component 202 can provide the preliminary image to a local analysis component 204 and/or to a remote analysis component 204 on a server computing device 106 via network 104.

In another aspect of the embodiment, preview component 202 collects environment information associated with context cues not visible in a preliminary image. For example, preview component 202 can use a microphone associated with camera computing device 102 to determine the level of background noise for consideration by analysis component 204.

Analysis component 204 of an embodiment of the present invention provides the capability to analyze the preliminary image and the environment associated with the preliminary image for context cues. The analysis component 204 interprets the context cues and maps the context cues to camera configuration parameters less intrusive to one or more subjects associated with the image, i.e., performs an image and environment analysis to determine if the subject(s) would find the use of certain features of the camera intrusive. Context cues can be, but are not limited to, lighting conditions detected through the lens, e.g., a dark setting is more likely to require a reduction or elimination of audio feedback, indoor versus outdoor conditions, default flash behavior, number of faces detected in the image, e.g., fewer faces can indicate a reduction or elimination of audio feedback, are the detected faces smiling or looking at the camera lens, e.g., smiling and/or looking at the camera can indicate awareness of the photograph and accordingly, no intrusion by audio feedback, subjects eyes closed, e.g., the closed eyes can indicate a sleeping subject so disabling audio feedback and flash can be appropriate.

For example, analysis component 204 receives a preview image from preview component 202 for analysis. Analysis component 204 inspects the preview image for context cues and detects rows of heads facing away from the camera lens and a lone individual, partially concealed and at a higher elevation, facing the camera lens at a distance further than the rows of heads. The analysis component 204 is inspecting a preview image of an individual speaking at a podium on a stage before a seated audience. Further, the analysis component 204 detects a low ambient light level. From these cues, the analysis component 204 decides to recommend disabling the audible feedback, e.g., shutter sound effect, and the flash. The analysis component 204 then forwards the recommendations towards the configuration component 206 for further processing. In another example, analysis component 204 detects a high ambient noise level, such as background noise at a party, analysis component 204 determines that audible feedback is appropriate and dynamically sends the recommendation along with a recommended volume setting towards configuration component 206.

Further, analysis component 204 can store images in image context database 110 for use in analysis of subsequent images, e.g., mapping device configuration settings to impact on a subject(s) past behavior. In one aspect, if one or more prior image subjects have a negative reaction to a particular configuration setting then analysis component 204 can change the configuration when analysis component 204 detects the subject in a preview image. For example, if one of a group of children squints or cries whenever a flash is used then the analysis component 204 can determine if the particular child is in the preview image and disable the flash for photographs containing the offended child. In this manner, analysis component 204 predicts that the flash will disturb a particular child.

In another embodiment, analysis component 204 can correlate a subject's behavior, to a specific environment, e.g., mapping device configuration settings based on previous impact of a known location context. For example, the analysis component 204 determines a child will not cry with flash usage when photographed in the familiar surroundings of home but will cry with flash usage when photographed in a non-familiar environment such as a city street. The analysis component 204 can select a preferred configuration or make configuration changes to individual configuration parameters based on the environmental context of the subject(s) in the preview image, i.e., image environment. As described previously, the analysis component 204 makes a comparison of the preview image to images stored in the image context database based on the subjects detected in the preview image.

It should be noted that the embodiments described herein reduce the intrusiveness of an image capture device configuration on one or more specific subjects by evaluating various aspects of the subject in real-time. Further, the embodiments generates a history of analysis and maps the history to previous configurations and resulting responses, as well as drawing similarities from associated individuals. It should further be noted that the embodiments provide the capability to map a current configuration of an image capture device to the reaction of one or more subjects in the image and to determine if the configuration was intrusive. A history is generated on a per-subject basis, and can be used in a feedback loop over time to provide a better image capture device configuration for a subject in subsequent photographs or videos.

Configuration component 206 of an embodiment of the subject invention provides the capability to set configuration parameters before the camera computing device 102 captures an image as a photograph. In another aspect of the embodiments, the configuration component 206 can present suggested configuration parameter changes to the user for selection, if desired, by the user. For example, the analysis component 204 presents the configuration component 206 with a configuration that disables the flash, based on the image context, but notices a lamp in the image and provides this information to configuration component 206. Configuration component 206 then provides this information to the user before committing the image to storage and allows the user to turn on the lamp to add light to the image.

Figure 3:
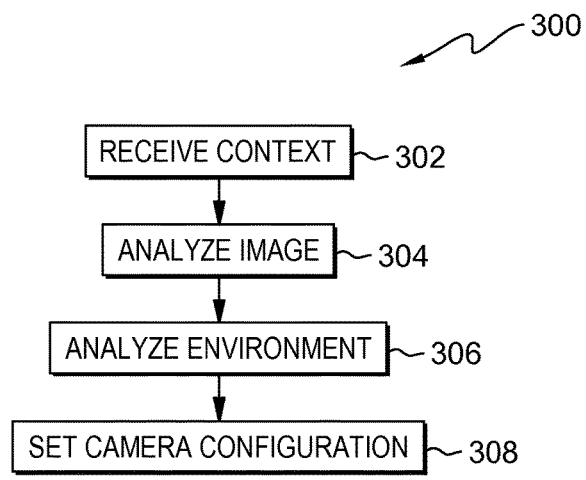
FIG. 3 is a flowchart depicting operational steps of an image context based camera configuration, within an image capture computing environment, in accordance with an embodiment of the present invention.

FIG. 3 is a flowchart 300 depicting operational steps of an image context analysis program 108 providing non-intrusive configuration settings, based on one or more subjects detected in an image preview and image environment context, in accordance with an embodiment of the present invention. The flowchart 300 comprises the steps of receive context 302, analyze image 304, analyze environment 306 and set camera configuration 308.

The receive context 302 step of embodiments depicted herein receives a preliminary image via preview component 202. Further, receive context 302 step collects data associated with the image environment context surrounding the preview image, based on inputs associated with camera computing device 102. For example, receive context 302 step can determine ambient light level and ambient sound level. Receive context 302 step then forwards the preview image and the image environment context to analyze image 304 step and analyze environment 306 steps for further processing.

Next, the analyze image 304 step of embodiments depicted herein receives a preliminary image, via image preview component 202, for analysis. Analyze image 304 step searches the preliminary image for context cues, as previously described, identifying obtrusive configurations and/or parameters based on the subject(s) identified in the preliminary image. It should be noted that analyze image step 302 can search image context database 110 via analysis component 204 for subject(s) identified in the preliminary image and select non-obtrusive configurations based on the results of the search.

Continuing, the analyze environment 306 step of embodiments depicted herein receives environment information associated with the preliminary image, via image preview component 202, for analysis. Analyze environment 306 step analyzes the environment information via analysis component 204 for context cues, as previously described, identifying obtrusive configurations and/or parameters based on the subject(s) identified in the preliminary image.

Further, analyze environment 306 step can search image context database 110 via analysis component 204 for subject(s) identified in the preliminary image and select non-obtrusive configurations based on a comparison of the environment depicted in the preview image and the environment depicted in the images stored in the image context database 110, e.g., if the subject finds the flash obtrusive in the environment stored in the image context database 110 and the environment is similar to the environment in the preview image then the subject will most likely find the flash intrusive for the current photograph. Accordingly, analyze environment 306 component will disable the flash based on the environment comparison and provide the configuration parameters to the set camera configuration 308 step.

Next, set camera configuration 308 step sets the configuration parameters of the camera computing device 102 based on the analysis results of analyze image 304 step and analyze environment 306 step. Set camera configuration 308 step can automatically set the configuration and complete the photograph or can prompt the user with the recommended configuration settings and request a confirmation from the user before applying the settings and completing the photograph. For example, the recommended settings could be to disable the flash and the audio feedback but the user chooses to accept disabling the audio feedback and enable the flash because there are no other light sources and the photograph requires additional illumination for proper exposure.

Figure 4:
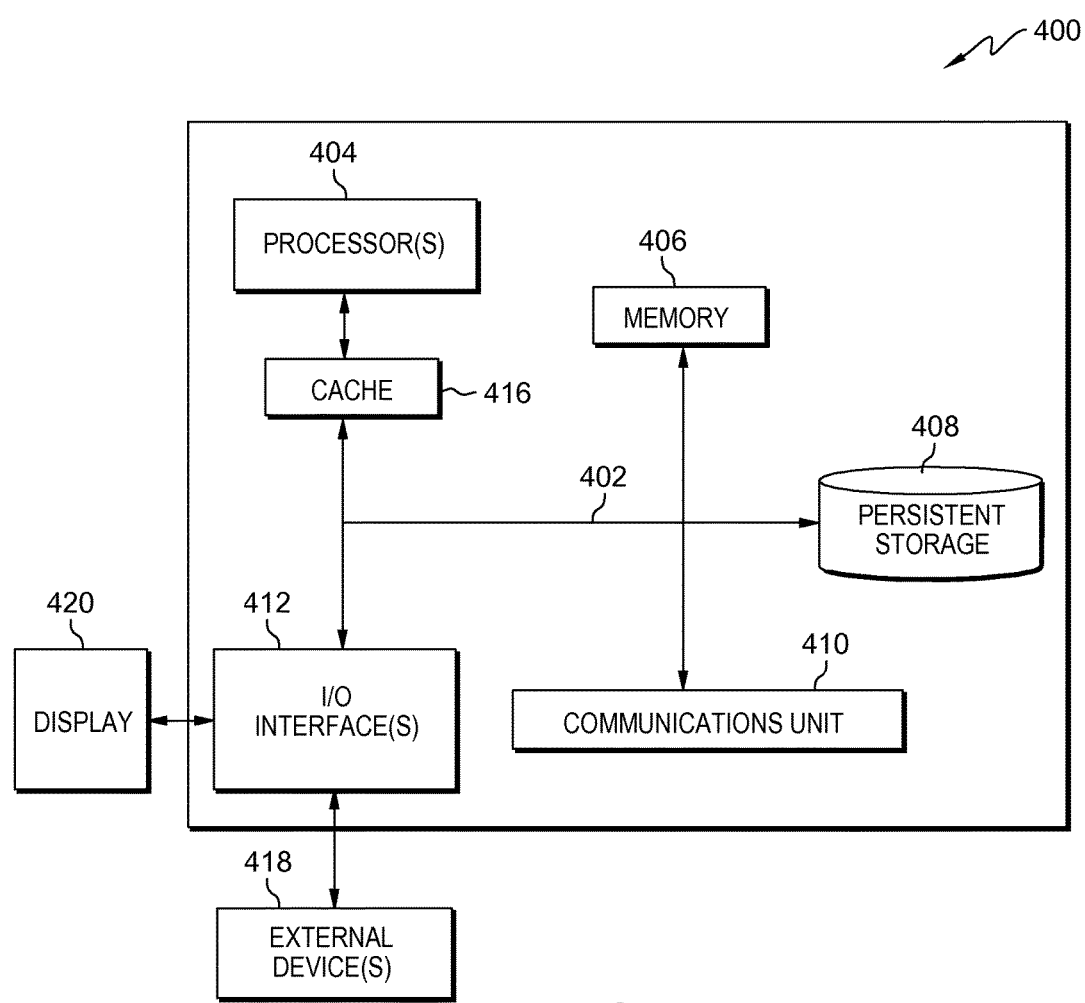
FIG. 4 is a block diagram of components of the image capturing computing environment, in accordance with an embodiment of the present invention.

FIG. 4 depicts computer system 400, an example computer system representative of camera computing device 102. Computer system 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Computer system 400 includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for updating settings associated with a camera to reduce intrusiveness to image subjects based on image context, the method comprising:
    analyzing, by one or more processors, a preliminary image to form a current context;
    comparing, by the one or more processors, the current context to one or more intrusiveness context cues; and
    responsive to detecting the current context matching the one or more intrusiveness context cues, performing, by the one or more processors, an action facilitating a change of image capture settings to reduce intrusiveness based on identifying one or more specific subjects in the preliminary image and their image history.

2. The computer-implemented method of claim 1, wherein one intrusiveness context cue is a sleeping specific subject and a shutter sound predicted to disturb the sleeping specific subject.

3. The computer-implemented method of claim 1, wherein one intrusiveness context cue is a specific subject known to react negatively to a flash and a flash predicted to disturb the specific subject.

4. The computer-implemented method of claim 1, further comprising:
    updating, by the one or more processors, the intrusiveness context cues dynamically based on an analysis of a history of images comprising the one or more specific subjects.

5. The computer-implemented method of claim 1, wherein the intrusiveness context cues comprise lighting conditions, location, number of specific subject faces, ambient light, specific subject facial expressions, specific subject visual direction and image environment.

6. The computer-implemented method of claim 5, wherein the camera further comprises a microphone for detecting ambient noise, and muting the shutter sound if the ambient noise is below a preconfigured minimum.

7. The computer-implemented method of claim 1, wherein the action is at least one of changing a configuration setting, providing notification of a recommended configuration and providing one or more environment change recommendations.

8. The computer-implemented method of claim 7, wherein one of the one or more environment change recommendations is recommending an alternative light source, visible in the preliminary image, for providing additional light for image capture.

9. A computer program product for reducing intrusiveness to image subjects based on updating a configuration associated with a camera, the computer program product comprising:
    one or more non-transitory computer readable storage media and program instructions stored on the one or more non-transitory computer readable storage media, the program instructions comprising:
    program instructions to, analyze a preliminary image to generate a current context;
    program instructions to, compare the current context to one or more intrusiveness context cues; and
    responsive to detecting the current context matching the one or more intrusiveness context cues, program instructions to, perform an action facilitating a change of the configuration to reduce intrusiveness based on identifying one or more specific individuals in the preliminary image and their image history.

10. The computer program product of claim 9, wherein one intrusiveness context cue is a sleeping specific subject and a shutter sound predicted to disturb the sleeping specific subject.

11. The computer program product of claim 9, wherein one intrusiveness context cue is a specific subject known to react negatively to a flash and a flash predicted to disturb the specific subject.

12. The computer program product of claim 9 further comprising:
    program instructions to, update the intrusiveness context cues dynamically based on an analysis of a history of images comprising the one or more specific subjects.

13. The computer program product of claim 9, wherein the intrusiveness context cues comprise lighting conditions, location, number of specific subject faces, ambient light, specific subject facial expressions, subject visual direction and image environment.

14. The computer program product of claim 13, wherein the camera further comprises a microphone for detecting ambient noise, and muting the shutter sound if the ambient noise is below a preconfigured minimum.

15. The computer program product of claim 9, wherein the action is at least one of, program instructions to, change a configuration setting, provide notification of a recommended configuration and provide one or more environment change recommendations.

16. The computer program product of claim 15, wherein one of the one or more environment change recommendations is program instructions to, recommend an alternative light source, visible in the preliminary image, for providing additional light for image capture.

17. A computer system for reducing intrusiveness to image subjects based on updating a configuration associated with image capture, the computer system comprising:
one or more computer processors;
one or more non-transitory computer readable storage media;
program instructions stored on the one or more non-transitory computer readable storage media for execution by at least one of the one or more computer processors, the program instructions comprising:
program instructions to, analyze a preliminary image to generate a current context;
program instructions to, compare the current context to one or more intrusiveness context cues; and
responsive to detecting the current context matching the one or more intrusiveness context cues, program instructions to, perform an action facilitating a change of the configuration to reduce intrusiveness based on identifying one or more specific individuals in the preliminary image and their image history.

18. The computer system of claim 17, further comprising:
program instructions to, update the intrusiveness context cues dynamically based on an analysis of a history of images comprising the one or more specific subjects.

19. The computer system of claim 17, wherein the intrusiveness context cues comprise lighting conditions, location, number of specific subject faces, ambient light, subject facial expressions, specific subject visual direction and image environment.

20. The computer system of claim 17, wherein the action is at least one of, program instructions to, change a configuration setting, provide notification of a recommended configuration and provide one or more environment change recommendations.

* * * * *